United States Patent
Burky et al.

(10) Patent No.: US 7,711,929 B2
(45) Date of Patent: May 4, 2010

(54) METHOD AND SYSTEM FOR TRACKING INSTRUCTION DEPENDENCY IN AN OUT-OF-ORDER PROCESSOR

(75) Inventors: William E. Burky, Austin, TX (US); Krishnan Kailas, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 11/847,530

(22) Filed: Aug. 30, 2007

(65) Prior Publication Data

US 2009/0063823 A1 Mar. 5, 2009

(51) Int. Cl.
*G06F 9/30* (2006.01)
(52) U.S. Cl. .................................. 712/217; 712/216
(58) Field of Classification Search .................. None
See application file for complete search history.

(56) References Cited

U.S. PATENT DOCUMENTS

| | | | | |
|---|---|---|---|---|
| 5,850,533 A * | 12/1998 | Panwar et al. | ............... | 712/216 |
| 6,065,105 A * | 5/2000 | Zaidi et al. | .................... | 712/23 |
| 6,889,314 B2 * | 5/2005 | Samra et al. | ................ | 712/216 |
| 7,055,021 B2 * | 5/2006 | Kadambi | .................... | 712/217 |
| 7,571,302 B1 * | 8/2009 | Chen et al. | .................... | 712/217 |
| 2003/0033511 A1 * | 2/2003 | Akkary et al. | ............. | 712/235 |
| 2003/0217249 A1 * | 11/2003 | Postiff et al. | ................ | 712/217 |
| 2006/0095732 A1 * | 5/2006 | Tran et al. | ................... | 712/217 |

* cited by examiner

*Primary Examiner*—Eric Coleman
(74) *Attorney, Agent, or Firm*—Dillon & Yudell LLP

(57) ABSTRACT

A method of tracking instruction dependency in a processor issuing instructions speculatively includes recording in an instruction dependency array (IDA) an entry for each instruction that indicates data dependencies, if any, upon other active instructions. An output vector read out from the IDA indicates data readiness based upon which instructions have previously been selected for issue. The output vector is used to select and read out issue-ready instructions from an instruction buffer.

19 Claims, 8 Drawing Sheets

US 7,711,929 B2

METHOD AND SYSTEM FOR TRACKING INSTRUCTION DEPENDENCY IN AN OUT-OF-ORDER PROCESSOR

This invention was made with Government support under DARPA, NBCH3039994. THE GOVERNMENT HAS CERTAIN RIGHTS IN THIS INVENTION.

RELATED APPLICATION

The present invention is related to the subject matter of U.S. application Ser. No. 11/669,999, entitled, "Method and System for Dependency Tracking and Flush Recovery for an Out-of-Order Microprocessor," filed on Feb. 1, 2007. The content of the related application is incorporated herein by reference.

BACKGROUND OF THE INVENTION

1. Technical Field

The present invention relates in general to data processing systems and in particular to processors. Still more particularly, the present invention relates to an improved method and system for tracking instruction dependency in an out-of-order processor.

2. Description of the Related Art

Early processors executed only one instruction at a time and executed instructions in an order determined by the compiled machine-language program running on the processor. Such processors are known as "sequential" processors. Various techniques, such as pipelining, superscaling, and speculative instruction execution, are utilized to improve the performance of sequential processors. Pipelining breaks the execution of instructions into multiple stages, in which each stage corresponds to a particular execution step. Pipelined designs enable new instructions to begin executing before previous instructions are finished, thereby increasing the rate at which instructions can be executed.

"Superscalar" processors include multiple pipelines and can process instructions in parallel using two or more instruction execution pipelines in order to execute multiple instructions per processor clock cycle. Parallel processing requires that instructions be dispatched for execution at a sufficient rate. However, the execution rate of processors has typically outpaced the ability of memory devices and data busses to supply instructions and data to the processors. Therefore conventional processors utilize one or more levels of on-chip cache memory to increase memory access rates.

Superscalar processors can execute instructions simultaneously only when no data dependencies exist between the instructions undergoing execution in the pipelines. Thus, an instruction that depends on one or more preceding instructions to load required data into working operand registers cannot execute until all of the required data have been retrieved from cache or main memory. Furthermore, execution units cannot predict how long it may take to load data into the working operand registers. Older processors handled this uncertainty by delaying execution until the required data is fetched (i.e., by "stalling" the execution pipeline). Stalling instruction execution until data dependencies are resolved is inconsistent with high-speed processing requirements.

Consequently, conventional processors utilize speculative instruction execution to address pipeline stalls by enabling a second instruction that is data dependent on a first instruction to enter an execution pipeline before the first instruction has passed completely through the execution pipeline. Thus, in speculative execution processors, the data dependent second instruction, which is often referred to as a consumer instruction and which depends on the first (or producer) instruction, begins execution speculatively in order to avoid a pipeline stall.

In order to maintain correctness, processors flush incorrectly executed speculative instructions and their results. Conventional processors detect and correct such misspeculation by tracking instruction dependencies using large physical register mappers. The register mappers enable dependency chains to be established based on physical register identifiers. However these register mappers are complex and typically rely on content-addressable memory (CAM) functions to concurrently evaluate large numbers of physical register identifiers. To enable recovery from flushes, processors also save a previous physical register state for each instruction group and for each physical register type, thus requiring a large amount of memory area and slowing the process of register state recovery.

SUMMARY OF AN EMBODIMENT

A method of tracking instruction dependency in a processor issuing instructions speculatively includes recording in an instruction dependency array (IDA) an entry for each instruction that indicates data dependencies, if any, upon other active instructions. An output vector read out from the IDA indicates data readiness based upon which instructions have previously been selected for issue. The output vector is used to select and read out issue-ready instructions from an instruction buffer.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1A:
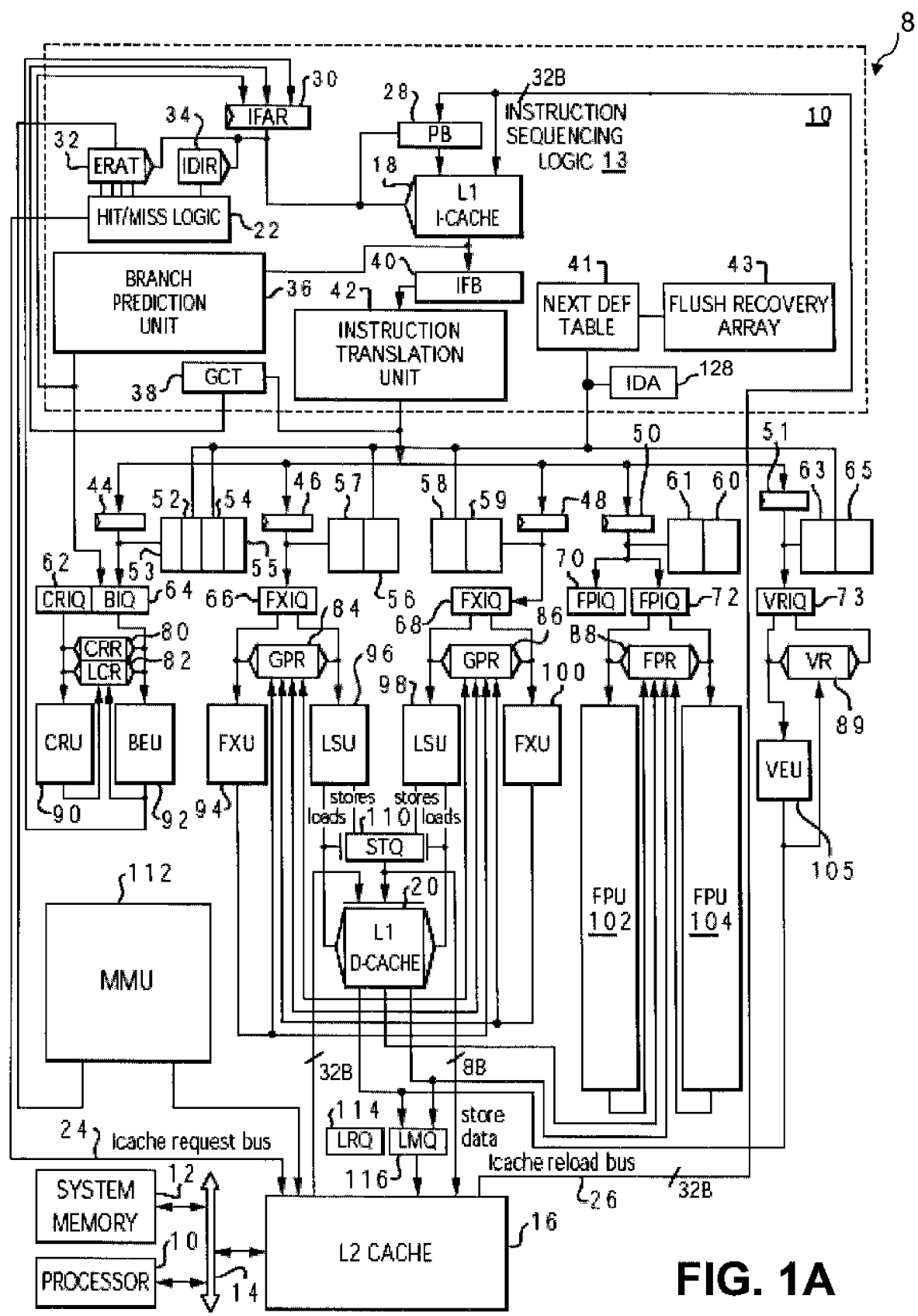
FIG. 1A is an exemplary embodiment of a data processing system in accordance with the present invention.

With reference now to FIG. 1A, there is illustrated a high level block diagram of an exemplary data processing system 8 in accordance with the present invention. As shown, data processing system 8 includes a processor 10 comprising a single integrated circuit superscalar processor, which, as discussed further below, includes various execution units, registers, buffers, memories, and other functional units that are all formed by integrated circuitry. Processor 10 may be coupled to other devices, such as a system memory 12 and a second processor 10, by an interconnect fabric 14 to form a data processing system 8 such as a workstation or server computer system. Processor 10 also includes an on-chip multi-level cache hierarchy including a unified level two (L2) cache 16 and bifurcated level one (L1) instruction (I) and data (D) caches 18 and 20, respectively. As is well known to those skilled in the art, caches 16, 18 and 20 provide low latency access to cache lines corresponding to memory locations in system memory 12.

Instructions are fetched and ordered for processing by instruction sequencing logic 13 within processor 10. In the depicted embodiment, instruction sequencing logic 13 includes an instruction fetch address register (IFAR) 30 that contains an effective address (EA) indicating a cache line of instructions to be fetched from L1 I-cache 18 for processing. During each cycle, a new instruction fetch address may be loaded into IFAR 30 from one of at least three sources: branch prediction unit (BPU) 36, which provides speculative target path addresses resulting from the prediction of conditional branch instructions, global completion table (GCT) 38, which provides sequential path addresses, and branch execution unit (BEU) 92, which provides non-speculative addresses resulting from the resolution of predicted conditional branch instructions. The effective address loaded into IFAR 30 is selected from among the addresses provided by the multiple sources according to a prioritization scheme, which may take into account, for example, the relative priorities of the sources presenting addresses for selection in a given cycle and the age of any outstanding unresolved conditional branch instructions.

If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 or elsewhere within processor 10 based upon recent access patterns. In response to a request address, L2 cache 16 outputs a cache line of instructions, which are loaded into prefetch buffer (PB) 28 and L1 I-cache 18 via I-cache reload bus 26, possibly after passing through predecode logic (not illustrated).

Once the cache line specified by the EA in IFAR 30 resides in L1 cache 18, L1 I-cache 18 outputs the cache line to both branch prediction unit (BPU) 36 and to instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions (e.g., PowerPC® instructions) into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by global completion table 38 to an instruction group, the members of which are permitted to be executed out-of-order with respect to one another. Global completion table 38 tracks each instruction group for which execution has yet to be completed by at least one associated EA, which is preferably the EA of the oldest instruction in the instruction group.

Following UISA-to-IISA instruction translation, instructions are dispatched in-order to latches 44, 46, 48, 50, and 51 according to instruction type. That is, branch instructions and other condition register (CR) modifying instructions are dispatched to latch 44, fixed-point and load-store instructions are dispatched to either of latches 46 and 48, floating-point instructions are dispatched to latch 50, and vector instructions are dispatched to latch 57. Each instruction requiring a rename register for temporarily storing execution results is then assigned one or more registers within a register file by the appropriate one of CR mapper 53, link and count register (LCR) mapper 55, exception register (XER) mapper 57, general-purpose register (GPR) mapper 59, floating-point register (FPR) mapper 61, and vector register (VR) mapper 65. According to the illustrative embodiment, register mapping may be performed by a simplified register file mapper, a reorder buffer (ROB), or other similar devices known to those skilled in the art. Register file mapping can thus be performed at instruction issue time or close to result write-back time, thereby reducing the lifetimes of allocated renames and increasing the efficiency of rename usage.

Figure 2A:
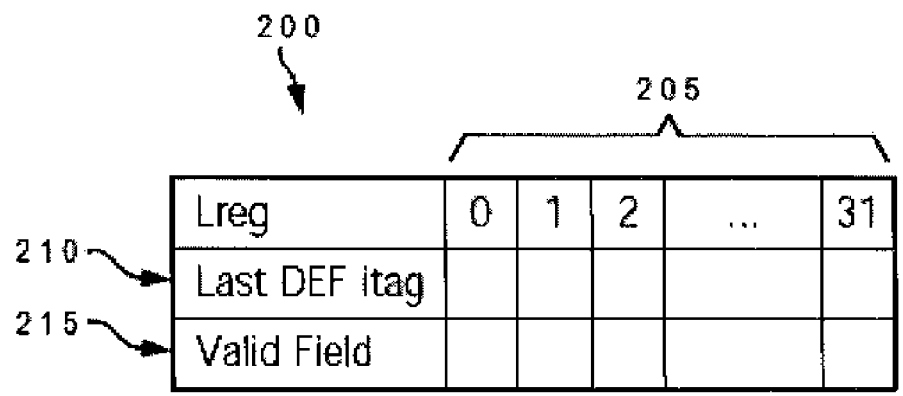
FIG. 2A illustrates a last definition (DEF) table in accordance with the present invention.

Instruction sequencing logic 13 tracks the allocation of register resource to each instruction using the appropriate one of CR last definition (DEF) table 52, LCR last DEF table 54, XER last DEF table 56, GPR last DEF table 58, FPR last DEF table 60, and VR last DEF table 63. An exemplary last DEF table is illustrated in FIG. 2A and described in detail below.

Figure 3:
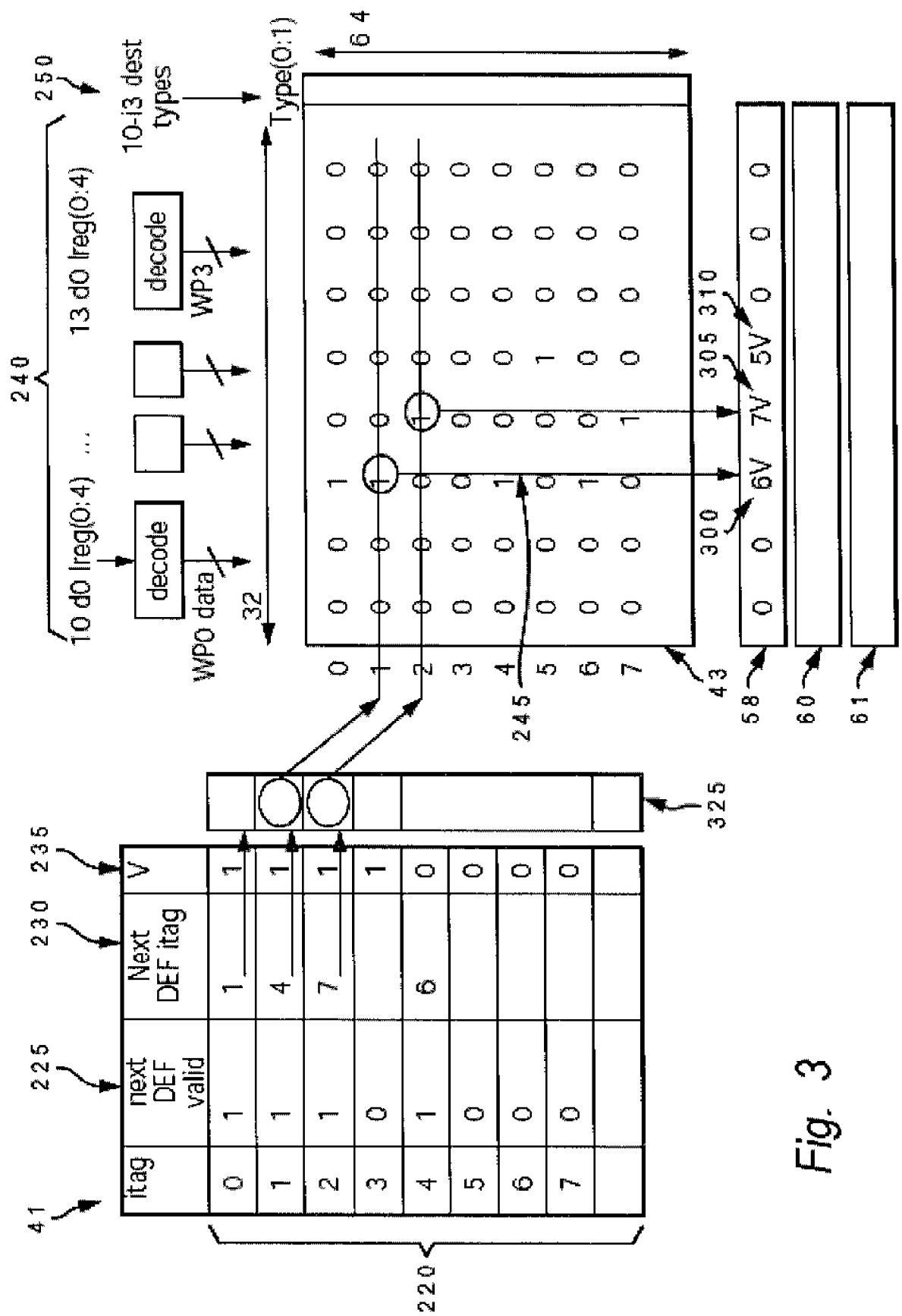
FIG. 3 illustrates a dependency tracking and flush recovery apparatus performing an exemplary flush recovery for an out-of-order processor in accordance with the present invention.
Figure 4:
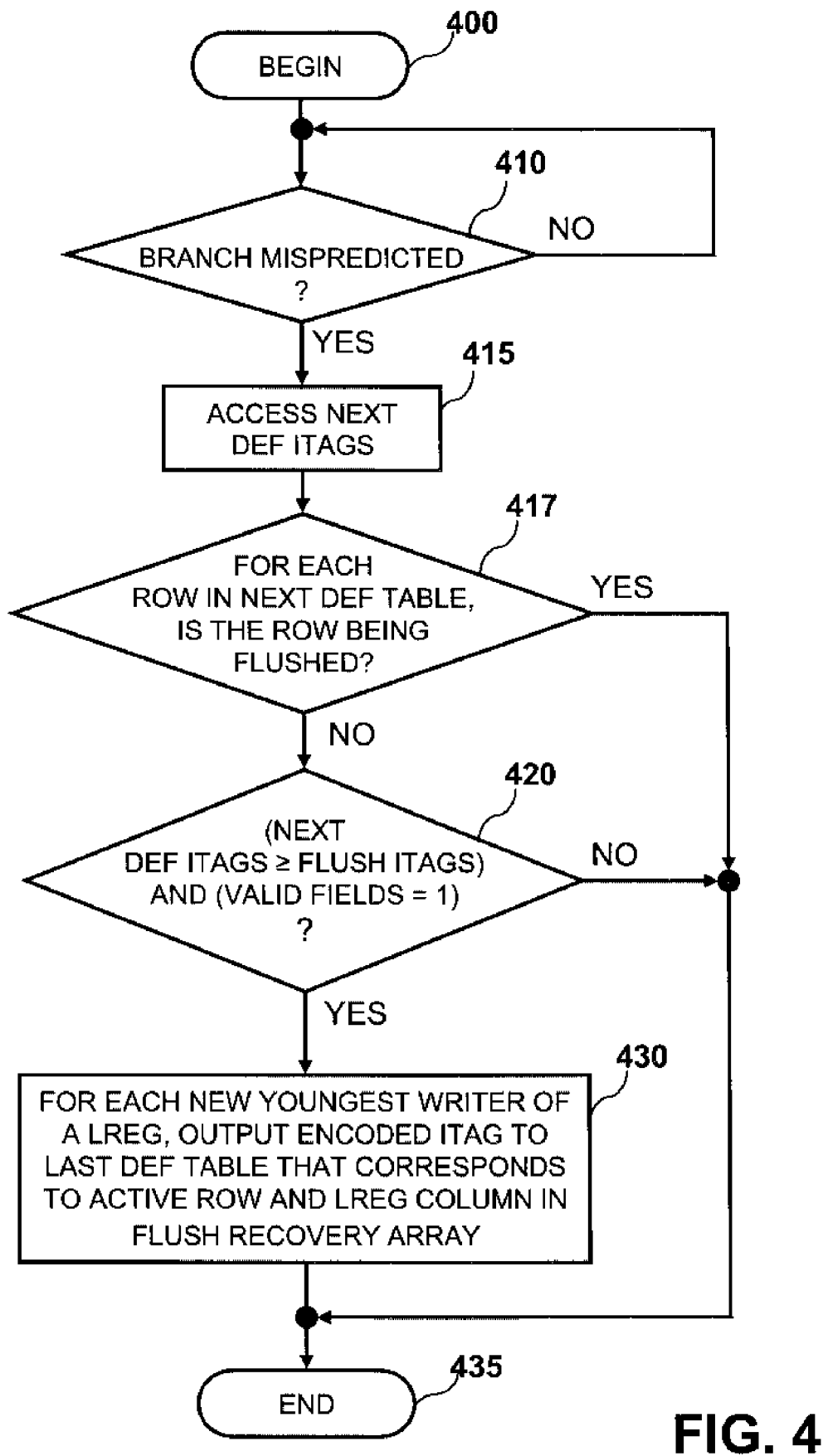
FIG. 4 is a high level logical flowchart of an exemplary method of dependency tracking and flush recovery for an out-of-order processor in accordance with one embodiment of the present invention.

Data processing system 8 also includes flush recovery array 43, which is coupled to next DEF tables 41. Flush recovery array 43 enables instruction sequencing logic 13 to utilize next DEF tables 41 to perform flush recovery operations, as illustrated in FIGS. 3-4 and discussed below.

After latches 44, 46, 48, 50, and 51, the dispatched instructions are temporarily placed in an appropriate one of instruction buffers (IBUFs) 62, 64, 66, 68, 70, 72, and 73. From IBUFs 62, 64, 66, 68, 70, 72, and 73, instructions can be issued opportunistically (i.e., possibly out-of-order) to the execution units of processor 10 for execution. In some embodiments, the instructions are also maintained in IBUFs 62-73 until execution of the instructions is complete and the result data, if any, are written back, in case any of the instructions needs to be reissued.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, two floating-point units (FPUs) 102 and 104 for executing floating-point instructions, and vector execution unit (VEU) 105 for executing vector instructions. Each of execution units 90-105 is preferably implemented as an execution pipeline having a number of pipeline stages.

During execution within one of execution units 90-105, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. Similarly, when executing vector instructions, VRU 105 accesses the VR register file 89, which in a preferred embodiment contains multiple VRs and a number of VR rename registers. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100, FPUs 102 and 104, or VEU 105, GCT 38 signals the appropriate last DEF table. The instruction is then removed from the issue queue, and once all instructions within its instruction group have completed, is removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, BPU 36 updates its prediction facilities, if necessary. If, however, the calculated path address does not match the predicted path address, BEU 92 supplies the correct path address to IFAR 30, and BPU 36 updates its prediction facilities, as described further below. In either event, the branch instruction can then be removed from IBUF 64, and when all other instructions within the same instruction group have completed, from GCT 38.

Following execution of a load instruction (including a load-reserve instruction), the effective address computed by executing the load instruction is translated to a real address by a data ERAT (not illustrated) and then provided to L1 D-cache 20 as a request address. At this point, the load operation is removed from IBUF 66 or 68 and placed in load data queue (LDQ) 114 until the indicated load is performed. If the request address misses in L1 D-cache 20, the request address is placed in load miss queue (LMQ) 116, from which the requested data is retrieved from L2 cache 16, and failing that, from another processor 10 or from system memory 12.

Store instructions (including store-conditional instructions) are similarly completed utilizing a store queue (STQ) 110 into which effective addresses for stores are loaded following execution of the store instructions. From STQ 110, data can be stored into either or both of L1 D-cache 20 and L2 cache 16, following effective-to-real translation of the target address.

Figure 1B:
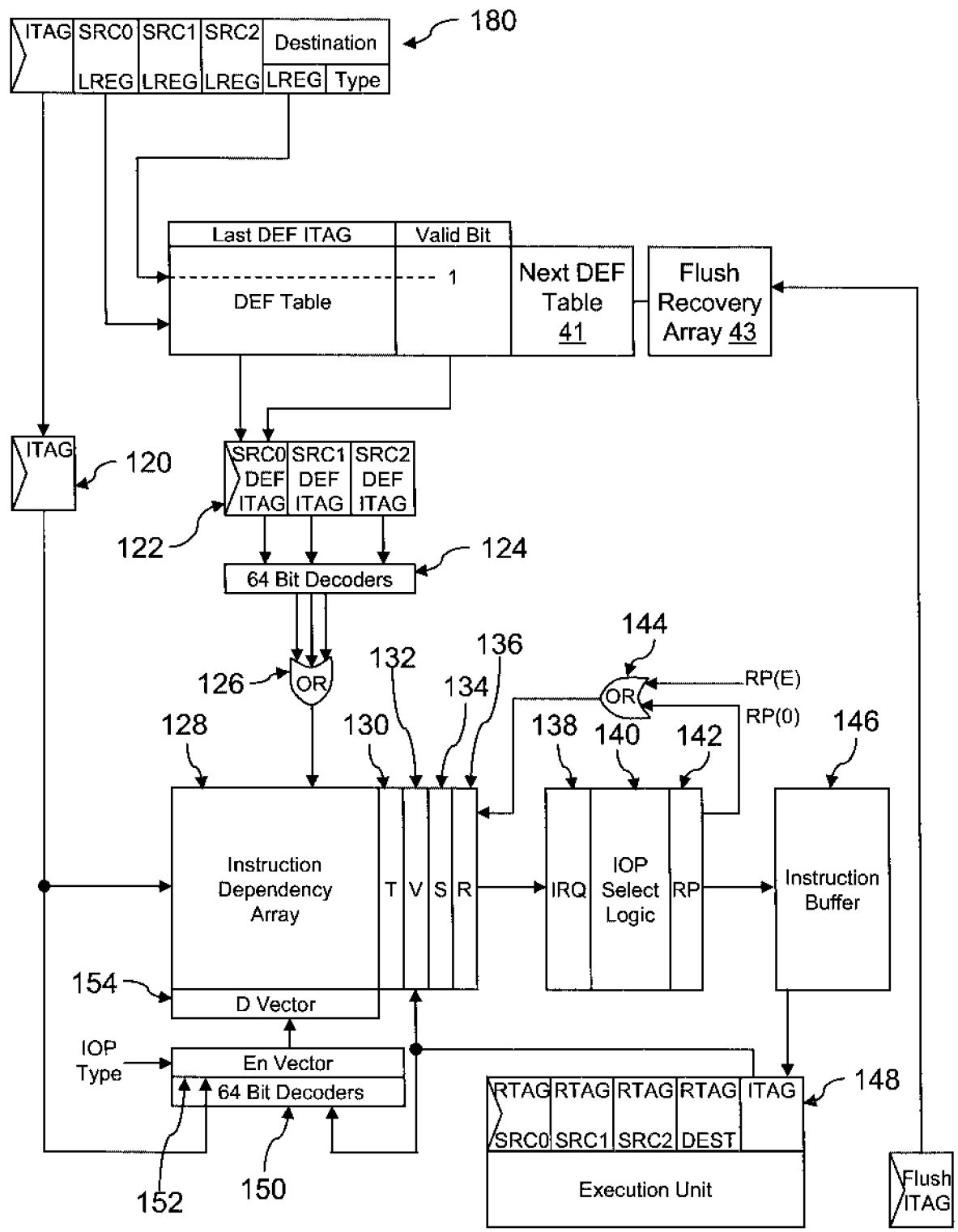
FIG. 1B is an exemplary embodiment of an instruction dependency array (IDA) in accordance with the present invention in relation to other components of the data processing system of FIG. 1A.

With reference now to FIG. 1B, there is illustrated a high level block diagram of an Instruction Dependency Array (IDA) 128 in accordance with the present invention in relation to other components of data processing system 8. IDA 128 tracks the status of issued Internal Operations (IOPs) and delays the issue of IOPs that are dependent on multi-cycle IOPs. In the depicted embodiment, IDA 128 is implemented as an N-by-N array of bits and associated control logic, where N (e.g., 64) is the maximum number of IISA instructions (also referred to herein as IOPs) that can be concurrently buffered in IBUF 146. As shown generally at reference numeral 180, each IOP is assigned an instruction tag (ITAG), can specify between zero and three source logical registers (LREGs) that will provide input operands for execution of the instruction, and, if applicable, can specify a destination logic register (LREG) for the results of instruction execution. Accordingly, each row of IDA 128 is accessed by a corresponding one of the N possible values of the instruction tag (ITAG) 120 assigned to each IOP. Columns of IDA 128 are written by a multi-hot N-bit data dependency vector indicating zero or more ITAGs upon which an ITAG is data-dependent. As shown, the multi-hot data dependency vector is provided by an OR gate 126 that logically combines up to three 1-hot encoded 64-bit ITAGs 122, which are decoded from the encoded output of a last DEF table (i.e., one of CR last definition (DEF) table 52, LCR last DEF table 54, XER last DEF table 56, GPR last DEF table 58, FPR last DEF table 60, and VR last DEF table 63) by 64-bit decoders 124.

IDA 128 has associated therewith a number of N-bit vectors arranged with respect to IDA 128 as either a row or a column. As described below, the N-bit vectors are utilized in conjunction with the data dependency information within IDA 128 to make determinations as to issuance of instructions from instruction buffer 146 to the execution units for execution or to appropriately update the contents of IDA 128. These N-bit vectors include those set forth in Table I below.

TABLE I

| Name of N-bit Vector | Description |
|---|---|
| T (Tail) | T vector 130 provides a 1-hot pointer to the ITAG of the oldest IOP that has yet to be issued for execution and is used to perform age-based priority selection of issue-ready IOPs in IRQ 138. In one embodiment, T vector 130 operates as a circular queue. |

TABLE I-continued

| Name of N-bit Vector | Description |
|---|---|
| V (Valid) | V vector 132 is a generally multi-hot vector identifying dispatched instructions that have not been flushed. |
| S (Selected) | S vector 134 marks data-ready IOPs (i.e., those for which any data dependencies have been resolved) that instruction sequencing logic 13 has selected from IDA 128 to be issued. |
| R (Ready) | R vector 136 identifies one or more ITAGs that instruction sequencing logic 13 has already selected to be issued. R vector 136 receives input from logical OR gate 144 that includes multiple instruction read port vectors, each of which corresponds to an execution unit. |
| IRQ (Instruction-Ready Queue) | IRQ vector 138 denotes ITAGs that correspond to the data-ready IOPs indicated by S vector 134 |
| Read Port (RP) (0..E) | IOP select logic 140 has a respective RP vector 142 that marks the ITAG of an IOP selected to be issued to each of E+1 execution units 148. Each RP vector 142 is thus a decoded one-hot address bit vector that identifies a selected IOP and the corresponding source and destination ITAGs, which are stored in GCT 38 and/or IBUF 146. A logical OR gate 144 combines multiple decoded one-hot RP vectors 142 and provides feedback to R vector 136. |
| D (Done) | D vector 154 identifies IOPs that have been issued for execution by an execution unit, generically illustrated as execution unit 148. |
| En (Enable) | En vector 152 stores IOP dependency information and enables IDA 128 to delay the issue of one or more individual IOPs that are dependent on multi-cycle IOPs. |

In an alternate embodiment, IDA 128 may additionally be read using a vector in IRQ 138, combined with a B2B vector via a logical AND, and combined with D vector 154 via a logical OR to enable back-to-back read out of a dependent IOP. Here, the B2B vector identifies IOPs that have latency of 1 and are enabled to wake a dependent IOP back-to-back. A Back-to-Back Target enable (B2BT) vector may be used to qualify the B2B readout of IDA 128, such that only one dependent IOP will ultimately be selected from IDA 128 via B2B readout. This B2B readout will be utilized whenever the vector in IRQ 138 is 1-hot, suggesting that the single active entry will be the next IOP selected for issue and that there are no other TOPs in IRQ 138 to choose from in the following cycle.

According to the illustrative embodiment, IBUF 146 includes storage for TOPs that are dependent on one or more source ITAGs and a destination ITAG for each buffered IOP. When an execution unit has read an IOP having an ITAG 148 from IBUF 146, ITAG 148 provides feedback input to V vector 132. A 64-bit decoder 150 also decodes ITAG 148 and provides input to En vector 152. Data processing system 8 may thus select issue-ready ITAGs at will for issue readout from IBUF 146.

With reference now to FIG. 2A, there is depicted last definition (DEF) table 200 in accordance with the present invention. Data processing system 8 preferably implements a respective last DEF table 200 for each of last DEF tables 52, 54, 56, 58, 60, and 63.

In one embodiment, last DEF table 200 includes multiple columns 205, each of which corresponds to a particular logical register (LREG) that may be referenced by an instruction. In other words, last DEF table 200 is indexed by the identifiers of logical registers; LREG identifiers are not stored in last DEF table 200. Each column 205 further includes at least two fields, including at least a last DEF instruction tag (ITAG) field 210 and valid field 215. According to the illustrative embodiment, an associated register file such as one of GPR files 84, 86, FPR file 88, or VR file 89 includes 120 physical registers to which 32 LREGs can be physically mapped by a register file mapper or ROB device. Utilizing LREGS instead of physical registers as index values into last DEF table 200 enables last DEF table 200 to occupy less space and have more rapid access than mappers tracking register use by physical register number. Although the depicted embodiment has 32 columns corresponding to 32 LREGs in an associated register file, it should be appreciated that different ones of last DEF tables 52, 54, 56, 58, 60, and 63 may have different sizes, depending upon the desired number of architected registers.

In one embodiment, last DEF table 200 utilizes one write port per instruction, and write port orthogonality is ensured via intra-group write after write (WAW) predecodes. Similarly, the read outputs of last DEF table 200 can be bypassed via intra-group read after write (RAW) predecodes. Instruction sequencing logic 13 can thus utilize multiple last DEF tables 200 and instruction dispatch groups to process multiple simultaneous instructions, to prioritize instructions, and/or to identify duplicate instructions. Since the instruction tags recorded within last DEF table 200 are read addresses, content-addressable memory (CAM) functions are not required for instruction source lookup.

When instruction sequencing logic 13 dispatches a new instruction, the last DEF ITAG field 210 corresponding to the logical register(s) written/defined by the instruction are updated with the ITAG of the instruction. Thus, last DEF table 200 always reflects the identities of the "youngest" instructions that define the LREGs in the associated register file. As utilized herein, the "youngest" ITAG refers to a unique instruction identifier that corresponds to the most recent instruction that writes or overwrites a particular LREG. When a last DEF ITAG field 210 is updated, the associated valid field 215 is also updated to a valid state. The contents of fields 210 and 215 are utilized during the processes of dependency tracking and flush recovery, which are illustrated in FIGS. 3-4 and discussed below.

Figure 2B:
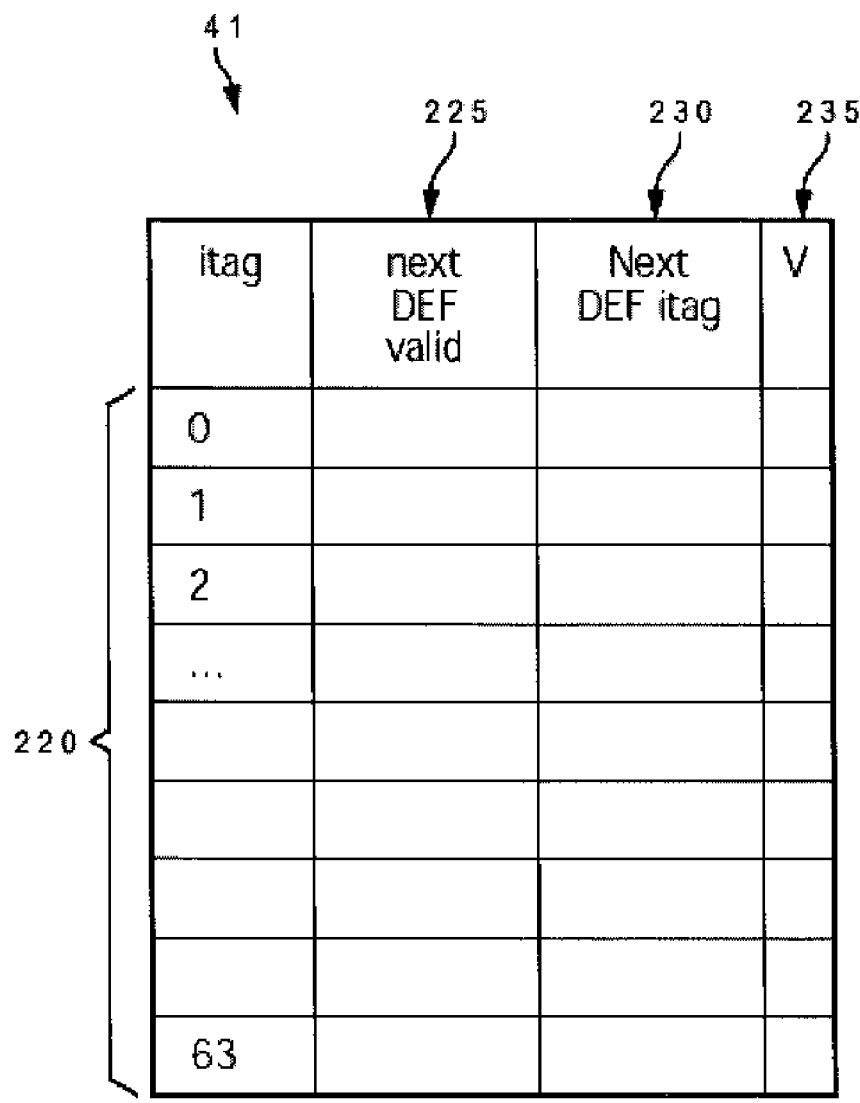
FIG. 2B illustrates a next DEF table in accordance with the present invention.

With reference now to FIG. 2B, there is illustrated a more detailed view of next DEF table 41 of data processing system 8 in accordance with the present invention. Next DEF table 41 includes multiple rows 220, each of which corresponds to a particular one of the 64 possible ITAGs that can concurrently be "in flight" in an exemplary embodiment of the instruction pipeline. Next DEF table 41 also includes, for each ITAG, a next DEF valid field 225, next DEF ITAG field 230, and valid field 235. When instruction sequencing logic 13 writes a new "youngest" DEF ITAG into a last DEF table 200 (from FIG. 2A), instruction sequencing logic 13 also writes the ITAG, if any, that the "youngest" instruction replaced into next DEF ITAG field 230 of the appropriate entry of next DEF table 41 and sets next DEF valid field 235 (e.g., to a "1"). Next DEF valid field 235 thus indicates whether the LREG, if any, modified by an instruction (which is identified by next DEF ITAG field 230) has been overwritten by another "younger" instruction.

Figure 2C:
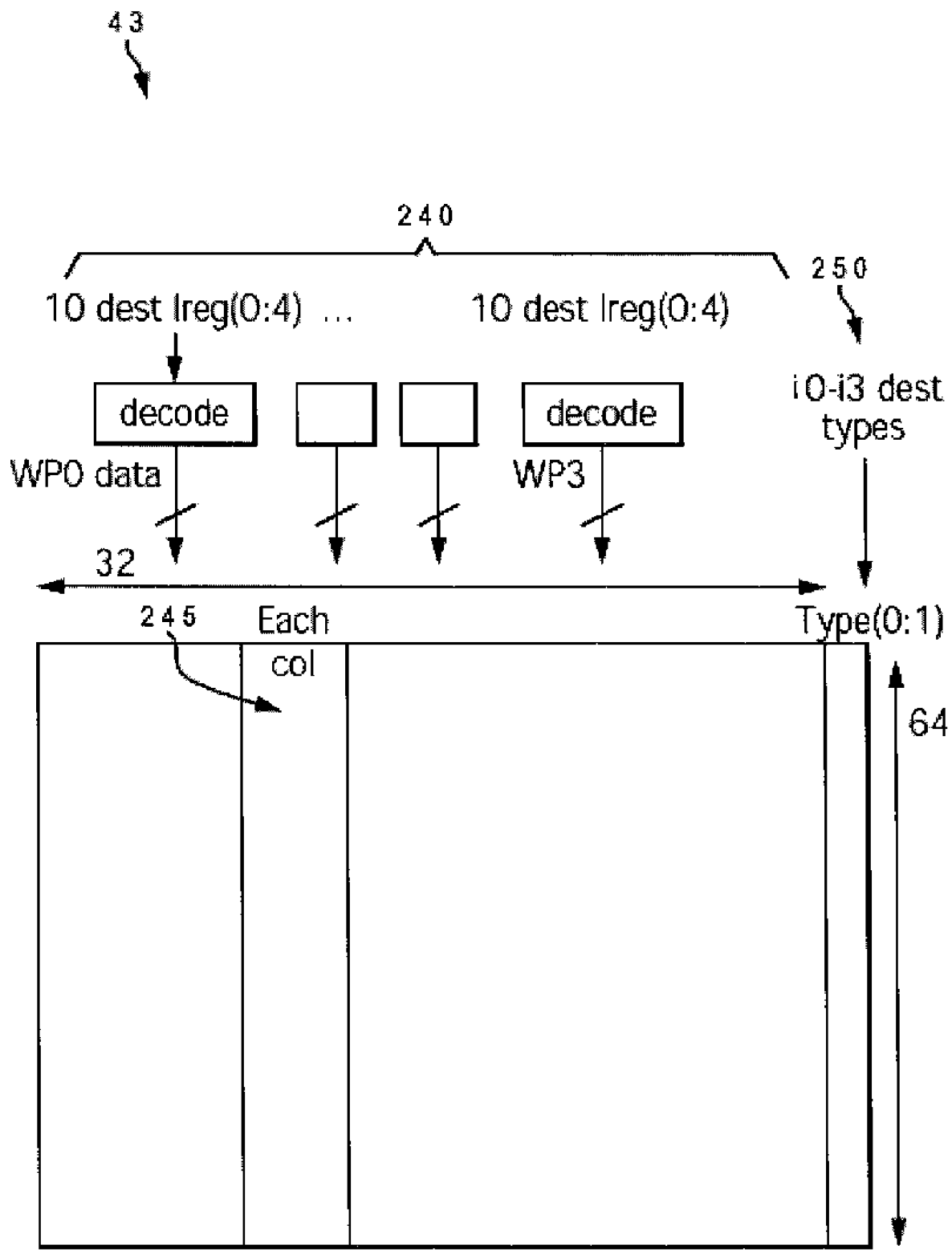
FIG. 2C illustrates a flush recovery array in accordance with the present invention.

With reference now to FIG. 2C, there is depicted flush recovery array 43 in accordance with an embodiment of the present invention. Flush recovery array 43 includes multiple (e.g., 32) decode columns 245, each corresponding to a respective LREG identifier within data processing system 8, and multiple (e.g., 64) rows, each uniquely corresponding to a particular one of the multiple ITAGs that can currently be assigned to instructions "in flight". Thus, each storage location (e.g., 1-bit cell) in flush recovery array 43 indicates whether a particular LREG identifier is written by the instruction identified by a particular ITAG.

According to the illustrative embodiment, data processing system 8 employs orthogonal register sets, meaning that at most one register set is accessed by each instruction. Consequently, each ITAG can be associated with an update to, at most, a single register type (e.g., GPR, FPR, or VR). The specific register file to which the LREG identifier maps is indicated by encoded bits within destination type column 250. Instruction sequencing logic 13 writes flush recovery array 43 at the time instructions are dispatched. In the depicted embodiment, flush recovery array 43 has 4 write ports 240 including decoders in order to support concurrent dispatch by instruction sequencing logic 13 of 4 instructions.

When recovery is required, flush recovery array 43 outputs encoded values that represent which ITAGs should be indicated by as the new "youngest" instructions in last DEF table 200 (from FIG. 2A). In one embodiment, instruction sequencing logic 13 accesses flush recovery array 43 in three sequential cycles and utilizes binary values encoded within destination type column 250 to determine which register type's last DEF table 200 to update (i.e., GPR last DEF table 58, FPR last DEF table 60, or VR last DEF table 63). In an alternate embodiment, instruction sequencing logic 13 may utilize a single six-bit "one-hot" encoded destination type to update all last DEF tables 200 during a single access cycle.

With reference now to FIG. 3, there is depicted a dependency tracking and flush recovery apparatus performing an exemplary flush recovery operation for a processor 10 in accordance with the present invention. The apparatus includes a next DEF table 41, a flush recovery array 43, and last DEF tables 58, 60, and 63 as previously described. In addition, FIG. 3 also includes flush ITAG vector 325, which enables instruction sequencing logic 13 to compare data from next DEF tables 41 (i.e., vectors representing new "youngest" ITAGs) to values within flush recovery array 43, as illustrated in block 420 of FIG. 4, which is discussed below.

In the exemplary processing scenario, processor 10 executes the following sequence of instructions:

0: add r2, r9, r3
1: add r2, r9, r4
2: add r3, r2, r9
3: bc (branch mispredicted)
4: add r2, r3, r9
5: add r4, r2, r9
6: add r2, r7, r4
7: add r3, r2, r2

In this instruction sequence, the initial numeral (e.g., 0, 1, 2, ..., 7) represents the ITAG assigned to the instruction by instruction sequencing logic 13, the next field is a mnemonic representing the operation code of the instruction (e.g., add or conditional branch), the third field designates the target logical register, if any, written by the instruction, and the final two fields designate the logical registers holding the input operands.

As instruction sequencing logic 13 sequentially issues the instructions in the instruction sequence, instruction sequencing logic 13 first assigns an ITAG of "0" to last DEF ITAG field 210 for LREG 2 in GPR last DEF table 58 as shown at reference number 300, since the fixed-point instruction for ITAG 0(i.e., add r2, r9, r3) updates LREG 2. Instruction sequencing logic 13 also sets the associated valid field 215, as indicated in FIG. 3 by a "V." Instruction sequencing logic 13 further sets the cell corresponding to ITAG 0 and LREG 2 (i.e., row 1, column 3) within flush recovery array 43 to "1" to indicate that ITAG 0 updates LREG 2 in case this information is later required in a future flush recovery operation.

When instruction sequencing logic 13 issues the instruction assigned ITAG 1, instruction sequencing logic 13 overwrites the last DEF ITAG field 210 for LREG 2 in GPR last DEF table 58 with "1" (i.e., ITAG 1) since ITAG 1 also updates GPR LREG 2. In order to track the previous value (i.e., ITAG 0), instruction sequencing logic 13 sets the next DEF ITAG field 230 within next DEF table 41 corresponding to ITAG 0 to "1" to indicate ITAG 1 has overwritten ITAG 0 and sets the associated next DEF valid field 225. Instruction sequencing logic 13 also sets the cell corresponding to ITAG 1 and LREG 2 (i.e., row 2, column 3) within flush recovery array 43 to indicate the instruction corresponding to ITAG 1 has written LREG 2.

When instruction sequencing logic 13 issues the instruction assigned ITAG 2, instruction sequencing logic 13 assigns "2" (i.e., ITAG 2 ) to the last DEF ITAG field 210 for LREG 3 in GPR last DEF table 58 as shown at reference numeral 305, since ITAG 2 updates GPR LREG 3. Instruction sequencing logic 13 also sets the associated valid field 215, as indicated in FIG. 3 by a "V." Instruction sequencing logic 13 further sets the cell corresponding to ITAG 2 and LREG 3 (i.e., row 3, column 4) within flush recovery array 43 to indicate the instruction corresponding to ITAG 2 updates LREG 3.

When instruction sequencing logic 13 issues the instruction assigned ITAG 4, instruction sequencing logic 13 overwrites the last DEF ITAG field 210 for LREG 2 in GPR last DEF table 58 with "4" (i.e., ITAG 4) since ITAG 4 also updates GPR LREG 2. In order to track the previous value (i.e., ITAG 1), instruction sequencing logic 13 sets the next DEF ITAG field 230 within next DEF table 41 corresponding to ITAG 1 to "4" to indicate ITAG 4 has overwritten ITAG 1 and sets the associated next DEF valid field 225. Instruction sequencing logic 13 also sets the cell corresponding to ITAG 4 and LREG 2 (i.e., row 5, column 3) within flush recovery array 43 to indicate the instruction corresponding to ITAG 4 updates LREG 2.

When instruction sequencing logic 13 issues the instruction assigned ITAG 5, instruction sequencing logic 13 assigns "5" (i.e., ITAG 5 ) to the last DEF ITAG field 210 for LREG 4 in GPR last DEF table 58 as indicated at reference numeral 310, since ITAG 5 updates GPR LREG 4. Instruction sequencing logic 13 also sets the associated valid field 215, as indicated in FIG. 3 by a "V." Instruction sequencing logic 13 further sets the cell corresponding to ITAG 5 and LREG 4

(i.e., row 6, column 5) within flush recovery array 43 to indicate the instruction corresponding to ITAG 5 updates LREG 4.

When instruction sequencing logic 13 issues the instruction assigned ITAG 6, instruction sequencing logic 13 overwrites the last DEF ITAG field 210 for LREG 2 in GPR last DEF table 58 with "6" (i.e., ITAG 6) since ITAG 6 also updates GPR LREG 2 . In order to track the previous value (i.e., ITAG 4), instruction sequencing logic 13 sets the next DEF ITAG field 230 within next DEF table 41 corresponding to ITAG 4 to "6" to indicate ITAG 6 has overwritten ITAG 4 and sets the associated next DEF valid field 225. Instruction sequencing logic 13 also sets the cell corresponding to ITAG 6 and LREG 2 (i.e., row 7, column 3) within flush recovery array 43 to indicate the instruction corresponding to ITAG 6 writes LREG 2.

Finally, when instruction sequencing logic 13 issues the instruction assigned ITAG 7, instruction sequencing logic 13 overwrites the last DEF ITAG field 210 for LREG 3 in GPR last DEF table 58 with "7" (i.e., ITAG 7) since ITAG 7 also updates GPR LREG 3 . In order to track the previous value (i.e., ITAG 2), instruction sequencing logic 13 sets the next DEF ITAG field 230 within next DEF table 41 corresponding to ITAG 2 to "7" to indicate ITAG 7 has overwritten ITAG 2 and sets the associated next DEF valid field 225. Instruction sequencing logic 13 also sets the cell corresponding to ITAG 7 and LREG 3 (i.e., row 8, column 4) within flush recovery array 43 to indicate the instruction corresponding to ITAG 7 updates LREG 3.

When instruction sequencing logic 13 thereafter detects a mispredicted instruction, instruction sequencing logic 13 initiates a flush recovery operation, as illustrated in FIG. 4 and discussed below. During the flush recovery operation, instruction sequencing logic 13 clears all ITAGs that issued after the mispredicted instruction from GPR last DEF table 58, FPR last DEF table 60, VR last DEF table 63, and next DEF table 41 using flush recovery array 43. Instruction sequencing logic 13 then restores, for each affected LREG, the "youngest" ITAG that wrote the LREG that issued before the mispredicted branch instruction. According to the illustrative embodiment of FIG. 3, it is assumed that the branch instruction corresponding to ITAG 3 was mispredicted and that the "youngest" ITAGs that wrote the LREGs that issued before the mispredicted branch instruction are ITAGs 0-2. According to the process of FIG. 4, instruction sequencing logic 13 accordingly updates LREG 2 value 300 from "6" to "1", updates LREG 3 value 305 from "7" to "2", and clears valid field 215 from LREG 4 value 310, which was originally not overwritten until after the mispredicted branch instruction.

Turning now to FIG. 4, there is illustrated a high level logical flowchart of an exemplary method of dependency tracking and flush recovery for an out-of-order processor in accordance with one embodiment of the invention. The process begins at block 400 and then proceeds to block 210, which depicts instruction sequencing logic 13 determining whether or not a branch instruction has been mispredicted, for example, in response to a signal from BEU 92. If instruction sequencing logic 13 has not detected a mispredicted branch, the process iterates at block 410 until a mispredicted branch instruction is detected. If instruction sequencing logic 13 detects a mispredicted branch instruction, instruction sequencing logic 13 accesses each of the values in next DEF ITAG field 230 within next DEF table 41 and utilizes a read port to access flush ITAG vector 325, as depicted in block 415.

At block 417, a determination is made for each row within next DEF table 41 (i.e., for each ITAG 220) whether the row is being flushed. For each row within next DEF table 41 that is being flushed, instruction sequencing logic 13 takes no further action for that row, and processing of that row terminates, as depicted in block 435. For each row within next DEF table 41 that is not being flushed, the process proceeds to block 420.

At block 420, a determination is made whether the magnitude of the values within next DEF ITAG field 230 are greater than or equal to the magnitude of flush ITAG vector 325, and whether the valid fields 235 corresponding to the values within next DEF ITAG field 230 are set. For each ITAG within next DEF table 41 that has a magnitude of the next DEF ITAG field 230 that is less than the magnitude of flush ITAG vector 325 or has a valid field 235 that is not set, instruction sequencing logic 13 takes no further action, and processing of such ITAGs terminates, as shown in block 435.

For each ITAG within next DEF table 41 for which the magnitude of the next DEF ITAG field 230 is greater than or equal to the magnitude of flush ITAG vector 325 and a set valid field 235 (i.e., for each valid next DEF ITAG field 230 that was dispatch subsequent to the mispredicted branch instruction), instruction sequencing logic 13 writes the ITAG 220 to the appropriate field 210 in last DEF table 200 by utilizing flush recovery array 43, as depicted in block 430. Instruction sequencing logic 13 accesses each row within flush recovery array 43 that corresponds to the each valid ITAG row 220 for which next DEF ITAG field 230 is greater than or equal to the magnitude of flush ITAG vector 325, and utilizes destination type field 250 to determine which last DEF ITAG field 210 (i.e., LREG) within each last DEF table 200 to update. For example, if the next DEF ITAG field 230 of ITAG 1 in next DEF table 41 contains a flushed ITAG, instruction sequencing logic 13 accesses the row corresponding to ITAG 1 (i.e., the second row) of flush recovery array 43 and locates a "1" in a particular decode column 245 (i.e., the column of the corresponding LREG). Instruction sequencing logic 13 utilizes destination type field 250 to determine which last DEF table 200 ITAG 1 corresponds to and overwrites last DEF ITAG field 210 in the appropriate column (i.e., LREG) with the value in next DEF ITAG field 230. Instruction sequencing logic 13 thus utilizes flush recovery array 43 to quickly update GPR last DEF table 58, FPR last DEF table 60, and VR last DEF table 63 in parallel with the appropriate encoded ITAGs that wrote LREGs. The flush recovery process then terminates at block 435.

Figure 5:
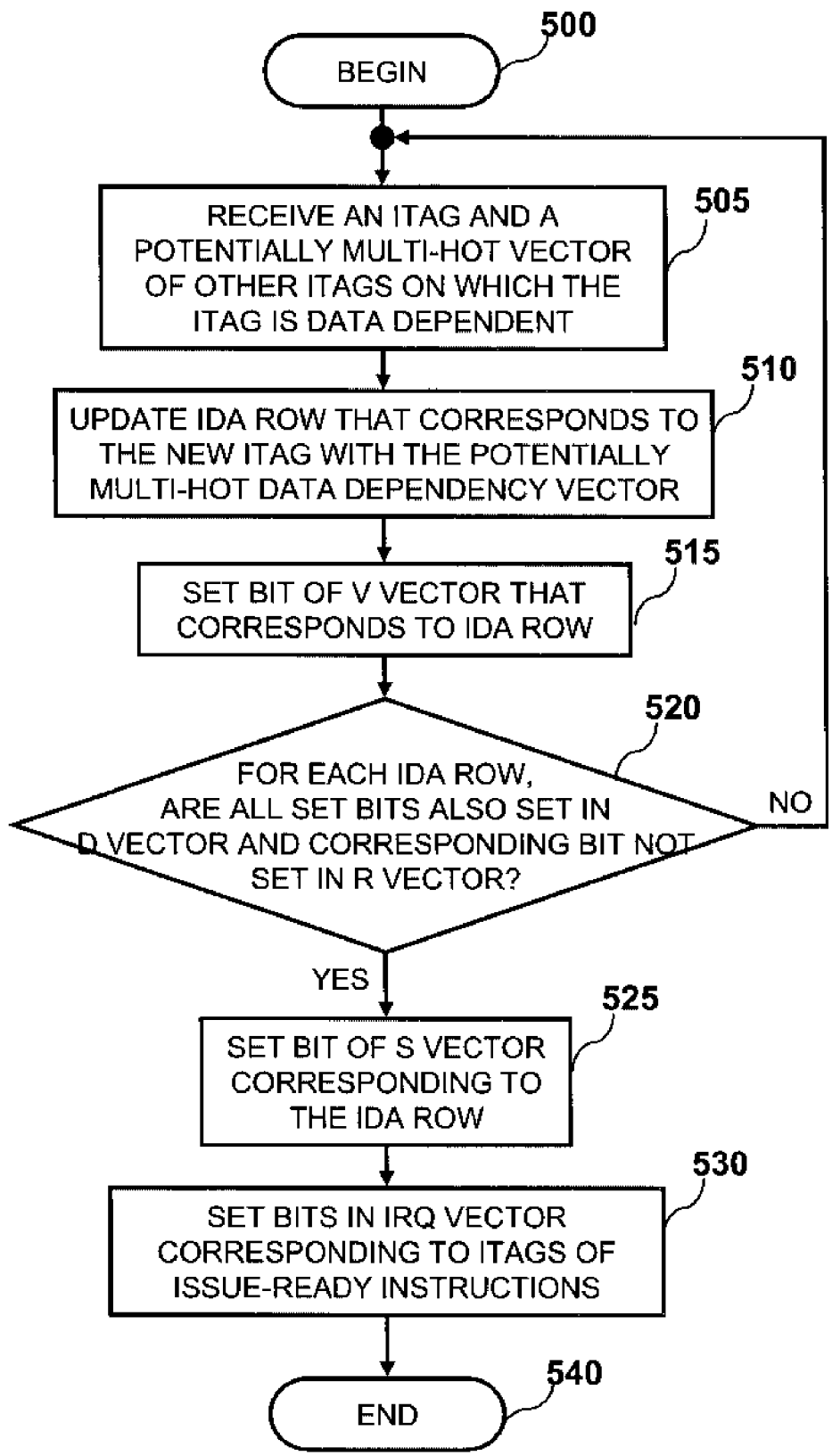
FIG. 5 is a high level logical flowchart of an exemplary method of updating an instruction dependency array (IDA), in accordance with an embodiment of the invention.

With reference now to FIG. 5, there is illustrated a high level logical flowchart of an exemplary method of updating an IDA (e.g., IDA 128 from FIG. 1B), in accordance with an embodiment of the invention. The process begins at block 500 in response to instruction sequencing logic 13 (FIG. 1A) dispatching an IISA instruction (or IOP) from instruction translation unit 42. IDA 128 receives an N-bit 1-hot encoded ITAG 120 (FIG. 1B) of the dispatched instruction from instruction translation unit 42 and receives from OR gate 126 an N-bit possibly multi-hot data dependency vector indicating other ITAGs, if any, on which the dispatched instruction is data-dependent, as depicted in block 505. In response to receipt of the dispatched ITAG 120 and the data dependency vector, IDA 128 updates the row of IDA 128 that corresponds to the newly dispatched ITAG with the contents of the data dependency vector, as shown in block 510. To indicate that the ITAG is valid, IDA 128 then sets the bit of the N-bit V vector 132 that corresponds to the row of the newly dispatched ITAG, as depicted in block 515.

At block 520, IDA 128 compares D vector 154 with each of its rows to determine whether, if for any row, all of the set bits (which indicate the ITAGs upon which the IOP is data-dependent) have corresponding bits set in D vector 154. If so, the IOP is ready to issue in that any previous data-dependencies that inhibited issue have been resolved. IDA 128 further qualifies any such row at block 520 by determining whether the corresponding bit in S vector 134 is not set (i.e., if the IOP has not already been selected from IDA 128 for addition to IRQ 138). In response to a negative determination at block 520, the process returns to block 505.

If, on the other hand, a positive determination is made at block 520, IDA 128 sets the corresponding bit of S vector 134, as shown in block 525, to indicate that the IOP is ready to issue. Instruction sequencing logic 13 sets one or more bits in IRQ 138 that correspond to the ITAGs of the issue-ready instructions, as depicted in block 530, and the process terminates at block 540.

Figure 6:
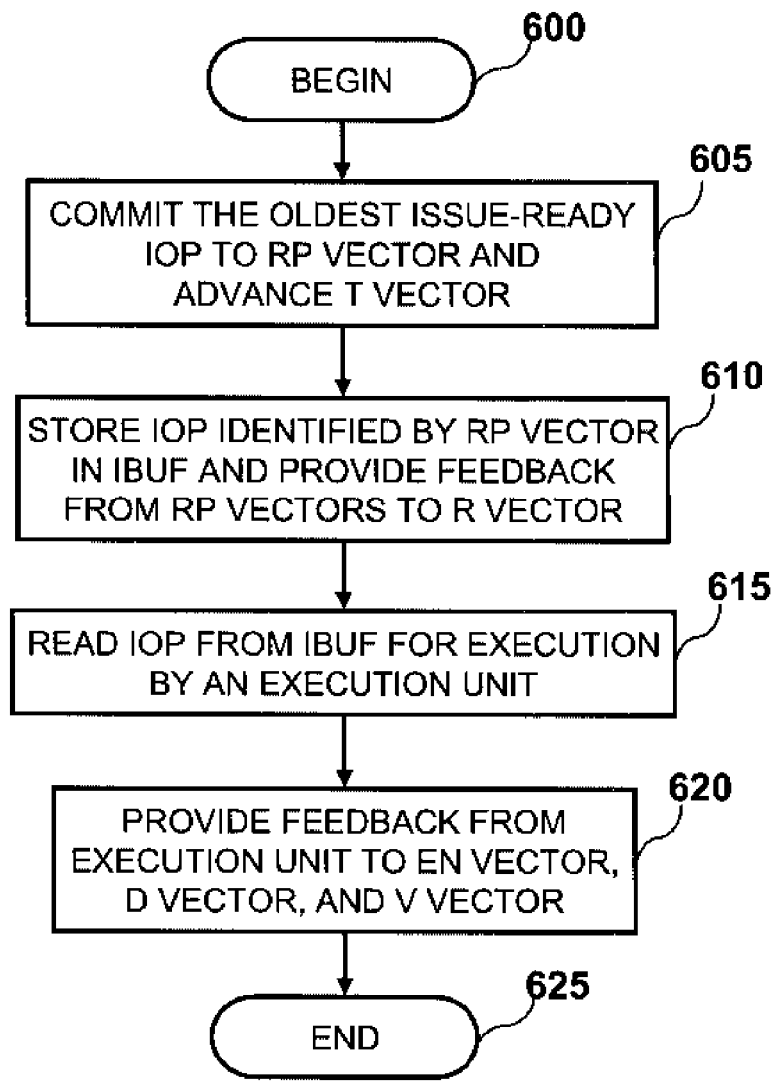
FIG. 6 is a high level logical flowchart of an exemplary method of reading an instruction dependency array (IDA), in accordance with an embodiment of the invention.

With reference now to FIG. 6, there is illustrated a high level logical flowchart of an exemplary method of reading an IDA, such as IDA 128 from FIG. 1B, in accordance with an embodiment of the invention. The process begins at block 600 in response to IOP select logic 140 (FIG. 1B) receiving an identification of one or more issue-ready instructions from IDA 128 within IRQ 138. Using T vector 130 to establish relative instruction age, IOP select logic 140 selects the oldest issue-ready IOP from IRQ 138 to include in RP vector 142 as depicted in block 605. RP vector 142 provides feedback to R vector 136 via logical OR gate 144. R vector 136 is a logical OR of multiple instruction read port vectors, each corresponding to an execution unit, as shown in block 610. RP vector 142 provides feedback to R vector 136 via logical OR gate 144 in order to prevent instructions that have already been selected for issue (i.e., instructions identified by the updated R vector 136) from being selected for issue multiple times.

Instruction sequencing logic 13 reads the IOP designated by RP vector 142 out of IBUF 146 for execution by one of execution units 90-105, as depicted in block 615. D vector 154 is updated by RP vector 142, in order to allow dependent TOPs to be read from IDA 128, as depicted in block 616. After receiving the IOP from IBUF 146, the execution unit subsequently provides feedback to EN vector 152 and V vector 132 to indicate that the instruction has been executed, as shown in block 620, and the process terminates at block 625. In one embodiment, the feedback provided from the execution unit to EN vector 152 enables IDA 128 to delay the issue of TOPs that are dependent on multi-cycle TOPs. Similarly, the feedback provided from the execution unit to D vector 154 and V vector 132 enables IDA 128 to track the status of issued IOPs. The present invention thus provides a method and system for tracking instruction dependency in an out-of-order processor.

While the invention has been particularly shown and described with reference to a preferred embodiment, it will be understood by those skilled in the art that various changes in form and detail may be made therein without departing from the spirit and scope of the invention. For example, it should be understood that the use herein of specific names are for example only and not meant to imply any limitations on the invention. The invention may thus be implemented with different nomenclature/terminology and associated functionality utilized to describe the above devices/utility, etc., without limitation. In addition, in the flow charts (FIGS. 4-6) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

What is claimed is:

1. In a processor having a register set that includes a plurality of physical registers to which a plurality of logical registers are mapped, a method comprising:
   providing an array having a plurality of entries each corresponding to a respective one of a plurality of instructions in an instruction stream; and
   in response to dispatch of an instruction among the plurality of instructions within said instruction stream:
      setting, in an entry among the plurality of entries in a row of the array corresponding to the instruction, one or more fields corresponding to one or more of said plurality of logical registers on which said instruction is data dependent;
      after said setting, comparing the entry to a vector indicating one or more logical registers ready to serve as operand sources for data dependent instructions; and
      in response to said comparing, outputting an indication of any instruction having no remaining data dependency.

2. The method of claim 1, further comprising:
   prior to issuance for execution, buffering instructions in an instruction buffer; and
   in response to said indication, selecting from the instruction buffer for issuance to an execution unit for execution one of said any instruction having no remaining data dependency.

3. The method of claim 1, further comprising suppressing output of an indication that an instruction has no remaining data dependency if said instruction has previously been issued for execution.

4. The method of claim 1, wherein said comparing further comprises a bit-by-bit comparison of bit vectors.

5. The method of claim 1, wherein said array is an N-by-N array, wherein N corresponds to a number of instructions concurrently active within said processor.

6. The method of claim 1, wherein said indication further comprises an entry in a circular issue-ready queue that identifies said any instruction having no remaining data dependency, wherein said issue-ready queue is arranged in program order with respect to said instruction stream.

7. The method of claim 1, further comprising delaying issuance for execution of any instruction having data dependency on multi-cycle instructions.

8. The method of claim 1, further comprising setting one or more bits in a bit vector to indicate a result of said comparing.

9. The method of claim 1, further comprising:
   allocating said logical registers to one or more of said plurality of instructions in said instruction stream;
   receiving a plurality of values corresponding to said logical registers in a definition table; and
   using said definition table to provide data dependencies to said array.

10. A processor, comprising:
   an execution unit that executes instructions;
   a register file including a plurality of physical registers;
   mapping logic that maps a plurality of logical registers to the plurality of physical registers within the register file;
   an array having a plurality of entries each corresponding to a respective one of a plurality of instructions in an instruction stream, wherein said array sets, in an entry among the plurality of entries in a row of the array corresponding to an instruction, one or more fields corresponding to one or more of said plurality of logical registers on which said instruction is data dependent in response to dispatch of the instruction among the plurality of instructions within said instruction stream, and wherein after said setting, said array compares the entry to a vector indicating one or more logical registers ready to serve as operand sources for data dependent instructions, and wherein said array outputs an indication of any instruction having no remaining data dependency in response to said comparing.

11. The processor of claim 10, further comprising:
an instruction buffer that buffers instructions prior to issuance for execution; and
selection logic that selects from the instruction buffer for issuance to an execution unit for execution one of said any instruction having no remaining data dependency in response to said indication.

12. The processor of claim 10, wherein said array suppresses output of an indication that an instruction has no remaining data dependency if said instruction has previously been issued for execution.

13. The processor of claim 10, wherein said array compares the entry to the vector by a bit-by-bit comparison.

14. The processor of claim 10, wherein said array is an N-by-N array, wherein N corresponds to a number of instructions concurrently active within said processor.

15. The processor of claim 10, wherein said indication further comprises an entry in a circular issue-ready queue that identifies said any instruction having no remaining data dependency, wherein said issue-ready queue is arranged in program order with respect to said instruction stream.

16. The processor of claim 10, further comprising an enable vector identifying instructions having data dependency on multi-cycle instructions for which issuance for execution should be delayed.

17. The processor of claim 10, further comprising an output bit vector associated with said array that indicates a result of said comparing.

18. The processor of claim 10, further comprising:
a definition table that records a mapping between said plurality of logical registers and said plurality of physical registers; and
decode logic, coupled to said definition table, that provides data dependency information to said array.

19. A data processing system, comprising:
at least one processor in accordance with claim 10;
an interconnect fabric coupled to the at least one processor; and
a system memory coupled to the interconnect fabric.

* * * * *